(12) United States Patent
Chiriku et al.

(10) Patent No.: US 6,515,226 B2
(45) Date of Patent: Feb. 4, 2003

(54) JUNCTION BOX

(75) Inventors: Akihiko Chiriku, Shizuoka-ken (JP); Norio Ito, Shizuoka-ken (JP); Hiroyuki Sasaki, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/131,088

(22) Filed: Apr. 25, 2002

(65) Prior Publication Data

US 2002/0157848 A1 Oct. 31, 2002

(30) Foreign Application Priority Data

Apr. 27, 2001 (JP) ........................................ 2001-133546

(51) Int. Cl.[7] ................................................. H02G 3/08
(52) U.S. Cl. ............................ 174/50; 174/58; 220/3.2; 439/76.2
(58) Field of Search ........................ 174/50, 52.1, 52.4, 174/59, 60, 61, 54, 58; 220/3.2, 4.02; 439/76.2, 949

(56) References Cited

U.S. PATENT DOCUMENTS

| 5,702,021 | A | * | 12/1997 | Ito | 220/284 |
| 5,755,579 | A | * | 5/1998 | Yanase et al. | 439/76.2 |
| 5,822,189 | A | * | 10/1998 | Isshiki | 174/59 |
| 5,995,380 | A | * | 11/1999 | Maue et al. | 439/76.2 |
| 6,077,102 | A | * | 6/2000 | Borzi et al. | 439/76.2 |
| 6,121,548 | A | * | 9/2000 | Matsuoka | 174/59 |
| 6,126,458 | A | * | 10/2000 | Gregory et al. | 439/76.2 |
| 6,194,656 | B1 | * | 2/2001 | Kondo et al. | 174/52.1 |
| 6,270,359 | B1 | * | 8/2001 | Kondo et al. | 439/76.2 |

\* cited by examiner

Primary Examiner—Dean A. Reichard
Assistant Examiner—Angel R. Estrada
(74) Attorney, Agent, or Firm—Finnegan, Henderson, Farrabow, Garrett & Dunner, L.L.P.

(57) ABSTRACT

A junction box of the present invention includes a junction box body, and a casing for housing the junction box body in either an upright position or a horizontal position. On the junction box body, provided is first locking piece to be engaged with a first inner side face of the casing in a state of upright disposition of the junction box body. The first locking piece abuts on a second inner side face of the casing in a state of horizontal disposition of the junction box body. In addition, also provided is second locking piece to be engaged with the first inner side face of the casing in the state of horizontal disposition of the junction box body. The second locking piece abuts on the second inner side face of the casing in the state of upright disposition of the junction box body.

6 Claims, 13 Drawing Sheets

JUNCTION BOX

BACKGROUND OF THE INVENTION

1. Field of the Invention

The present invention relates to a function box for intensively connecting and distributing multiple wire harnesses which are cabled on a vehicle or the like.

2. Description of the Related Art

In a function box to be loaded on a vehicle, single-layer or mutilayer wiring boards, which are configured with desired circuits by cabling bus bars and electric wires, are stacked on a wiring plate, and a function box body is essentially constituted by covering the wiring plate with an upper cover and an under cover. Thereafter, upon loading on the vehicle, the function box body thus housing the wiring plate is contained in a casing disposed in an engine room or the like. Electronic components such as external fuses and connectors are fitted on a front face of the junction box body The casing for housing the function box body is divided into an upper case and a lower case. The casing is structured to contain the junction box body inside the lower case in a state where the upper case is open, and to cover a housing hole with the upper case subsequently.

Such a function box may contain the function box body inside the casing in an upright position or in a horizontal position depending on specifications of a vehicle. In either case of housing the function box body in the upright position or in the horizontal position, the function box body must be locked and fixed to the casing. The junction box, which is normally formed in a rectangular solid shape, includes locking means severally provided on four sidewalls excluding a surface thereof, which constitutes an embedding stage for external fuses and connectors, and a rear face thereof. The locking means provided on two opposite sidewalls in one direction is used for engagement with the casing when the junction box is disposed in the upright position. On the other hand, the locking means provided on two opposite sidewalls in a direction perpendicular to the foregoing is used for engagement with the casing when the junction box is disposed in the horizontal position.

According to the proposed junction box, the locking means are provided on four sidewalls of the junction box body in consideration of housing the junction box body inside the casing either in the upright position or in the horizontal position. However, if the junction box body is disposed in the upright position, the locking means to be engaged upon horizontal disposition is not used. Meanwhile, if the junction box body is disposed in the horizontal position, the locking means to be engaged upon upright disposition is not used.

The junction box contained in the casing is engaged with the casing by use of the locking means. However, the junction box body may jolt in the casing owing to vibration when the vehicle is running. Vibration attributable to such jolting may cause defective connection of wires and the external connectors inside the junction box. For this reason, it is necessary to provide a member for preventing jolting of the junction box body between the junction box body and the casing. Therefore, the structure of the junction box may be complicated.

SUMMARY OF THE INVENTION

Accordingly, the present invention is made to solve the foregoing problems. An object of the present invention is to provide a junction box capable of simplifying a structure thereof by using a set of locking means of a junction box body, which is unused upon upright disposition or horizontal disposition, as means for preventing the junction box body from jolting.

The first aspect of the present invention provides a junction box, comprising: a junction box body; a casing for housing the junction box body in any one of an upright position and a horizontal position; first locking means for engaging the junction box body with the casing, provided on the junction box body; and second locking means for engaging the junction box body with the casing, provided on the junction box body, wherein the first locking means is engaged with a first inner side face of the casing in a state of upright disposition of the junction box body, and abuts on a second inner side face of the casing in a state of horizontal disposition of the junction box body, and wherein the second locking means is engaged with the first inner side face in the state of horizontal disposition of the junction box body and abuts on the second inner side face in the state of upright disposition of the junction box body.

According to the first aspect, the first locking means is engaged with the first inner side face of the casing when the junction box body is contained inside the casing in the upright position. Meanwhile, the second locking means is engaged with the first inner side face of the casing when the junction box body is contained inside the casing in the horizontal position. When the junction box body is contained in the upright position, the junction box body is prevented from jolting because the second locking means abuts on the second inner side face of the casing. In addition, when the junction box body is contained in the horizontal position, the junction box body is prevented from jolting because the first locking means abuts on the second inner side face thereof. Accordingly, the junction box body can be prevented from jolting by efficient use of either the second locking means which is not engaged upon upright disposition of the junction box body, or the first locking means which is not engaged upon horizontal disposition thereof. Therefore, it is not necessary to provide a dedicated anti-jolt member additionally. As a result, the structure of the junction box can be simplified.

The second aspect of the present invention provides the junction box according to the first aspect of the present invention, wherein the first locking means and the second locking means possess elastic force against abutment reactive force to be applied to the second inner side face.

According to the second aspect, either the first locking means or the second locking means abuts on the second inner side face of the casing and thereby prevents the junction box body either in the state of horizontal disposition or the state of upright disposition from jolting. In this event, the first locking means and the second locking means possess the elastic force against the abutment reactive force. In this way, the first locking means and the second locking means can absorb the abutment reactive force with a buffering action. As a result, it is possible to surely protect the junction box body from vibration and impact when a vehicle is running.

The third aspect of the present invention provides a junction box comprising: a junction box body; a casing for housing the junction box body in any one of an upright position and a horizontal position; a first locking piece provided on the junction box body; and a second locking piece provided on the junction box body, wherein the first locking piece is engaged with a first inner side face of the casing in a state of upright disposition of the junction box body and abuts on a second inner side face of the casing in a state of horizontal disposition of the junction box body, and wherein the second locking piece is engaged with the first inner side face in the state of horizontal disposition of the junction box body and abuts on the second inner side face in the state of upright disposition of the junction box body.

The fourth aspect of the present invention provides the junction box according to the third aspect of the present invention, wherein the first locking piece and the second locking piece possess elastic force against abutment reactive force to be applied to the second inner side face.

The fifth aspect of the present invention provides the junction box according to the third aspect of the present invention, wherein the first locking piece and the second locking piece are formed into L-shaped cross sections.

The sixth aspect of the present invention provides the junction box according to the fifth aspect of the present invention, further comprising: a first parallel protruding portion provided on the first locking piece; and a second parallel protruding portion provided on the second locking piece, wherein the first parallel protruding portion is provided so as to protrude toward a direction reverse to a direction of housing the junction box body in the casing in the state of upright disposition of the junction box body, and wherein the second parallel protruding portion is provided so as to protrude toward the direction reverse to the direction of housing the junction box body in the casing in the state of horizontal disposition of the junction box body.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
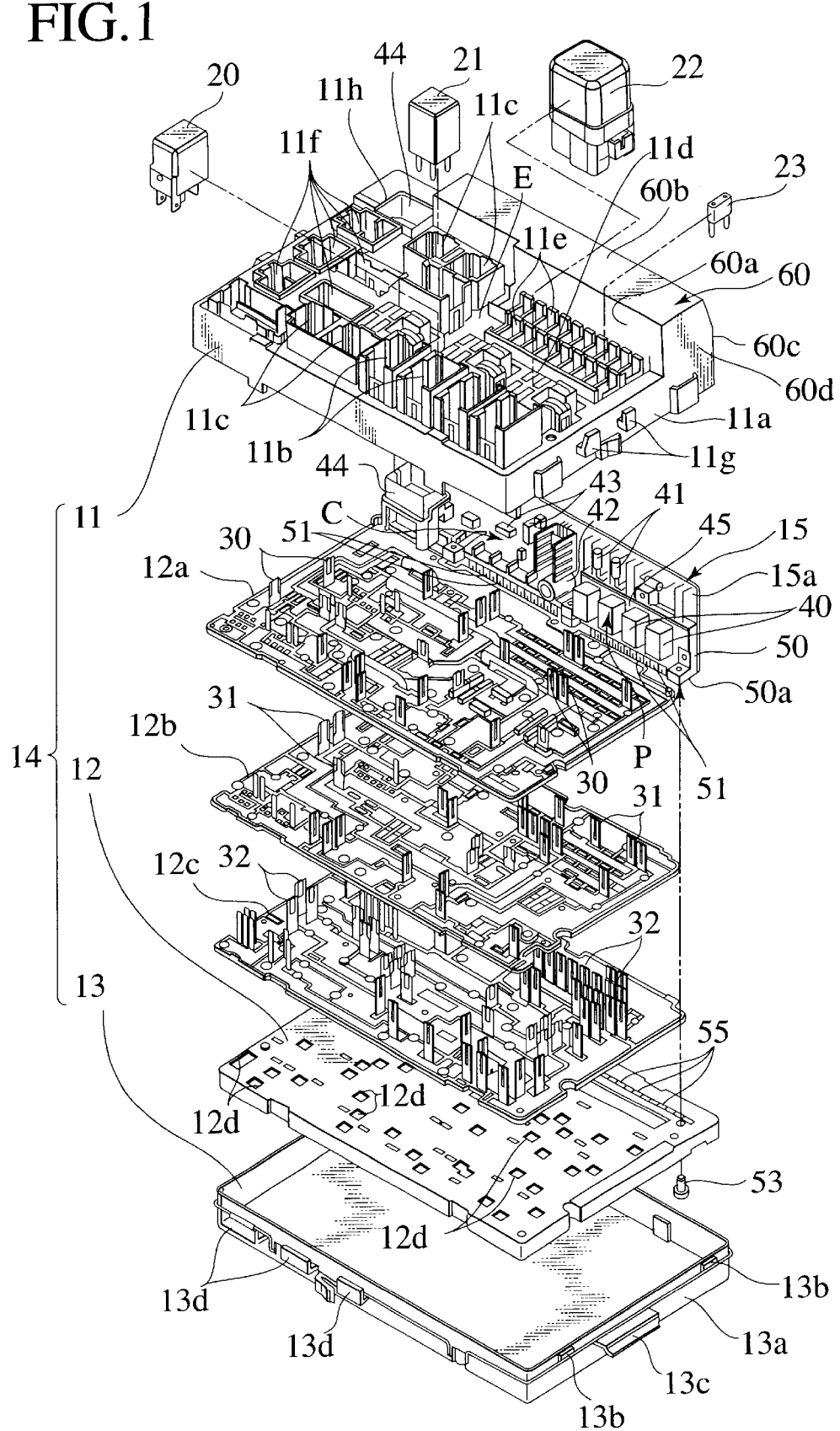
FIG. 1 shows an exploded perspective view of a junction box body, describing one embodiment of a junction box according to the present invention.

Embodiments of the present invention will be explained below with reference to the drawings, wherein like numbers are designated by like reference characters.

A junction box 10 of an embodiment has a constitution as follows. Specifically, a control substrate 15 is loaded on a wiring plate 12 formed by stacking multilayer wiring boards 12a, 12b and 12c, and the foregoing object is contained between an upper cover 11 and an under cover 13, thus constituting a junction box body 14 (see FIGS. 1 and 2). The junction box body 14 is contained inside a casing 18 composed of an upper case 16 and a lower case 17, thus constituting the junction box 10 (see FIG. 12).

Regarding the upper cover 11, a sidewall 11a surrounding the upper cover 11 is detachably fitted into an upper side periphery of a sidewall 13a surrounding the under cover 13 via lock claws 13b. Moreover, the wiring plate 12 and the control substrate 15 are contained inside the upper cover 11.

Figure 2:
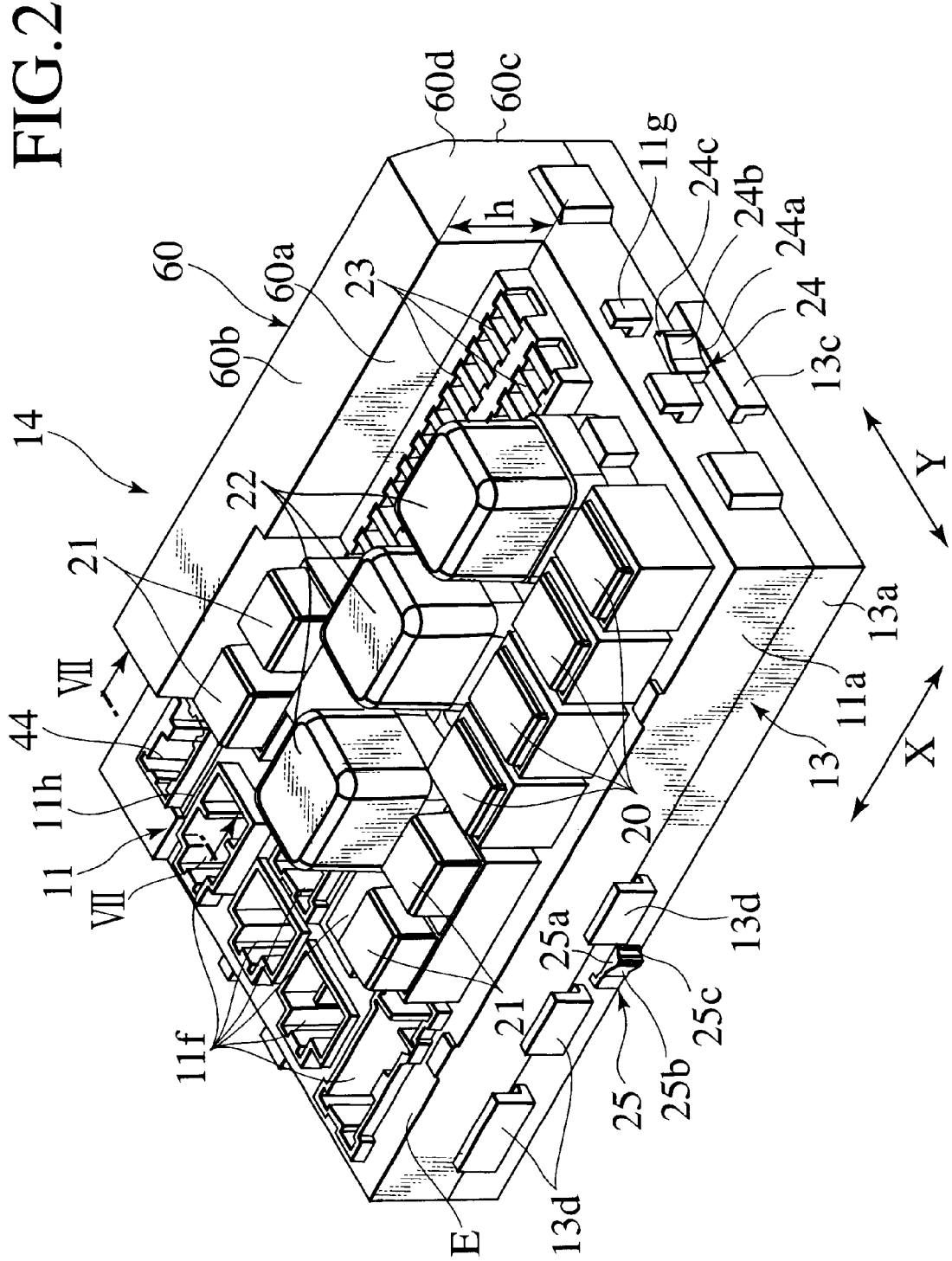
FIG. 2 shows a perspective view of the junction box body, describing one embodiment of the junction box according to the present invention.
Figure 3:
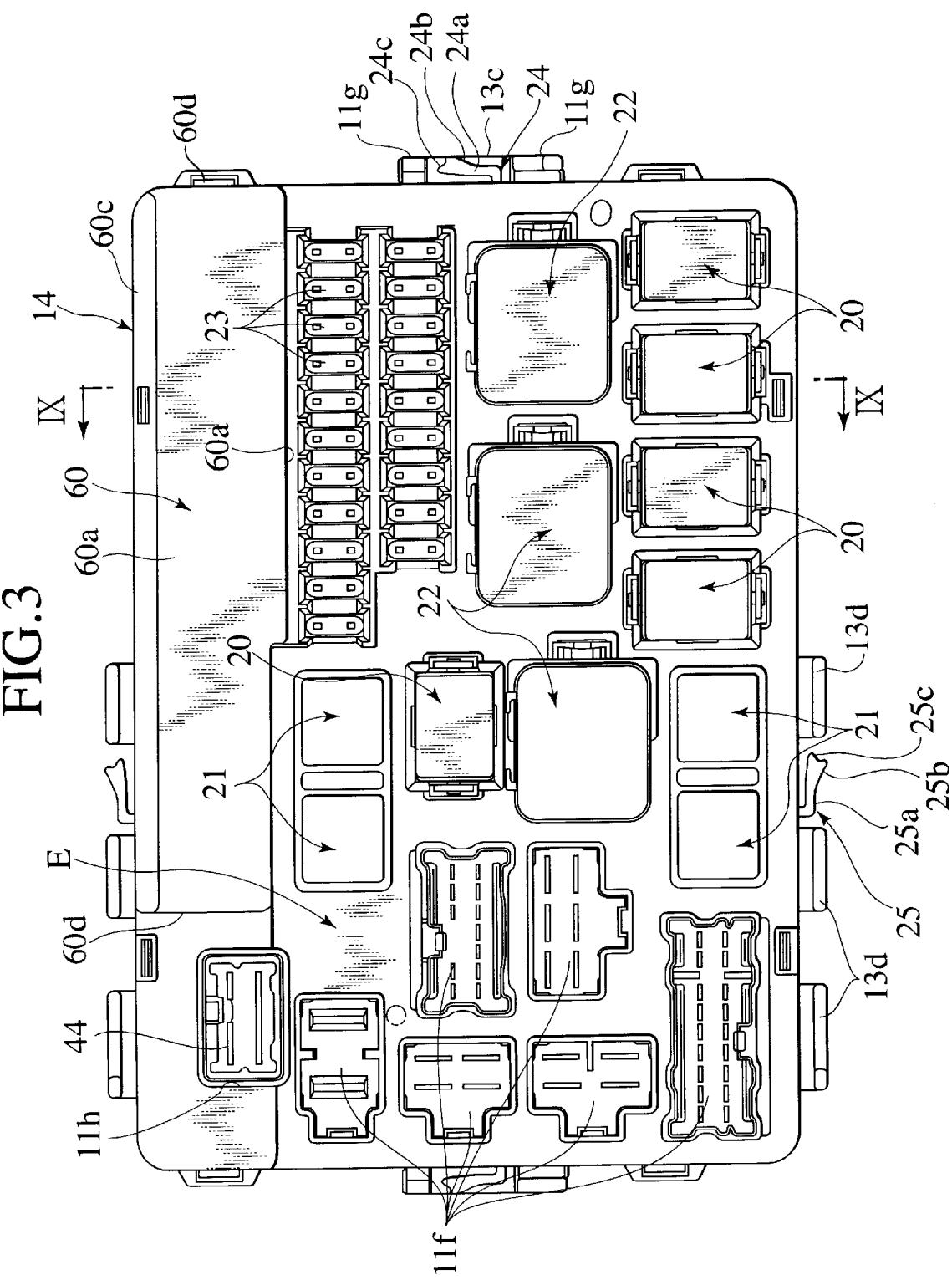
FIG. 3 shows a plan view of the junction box body, describing one embodiment of the junction box according to the present invention.

As shown in FIG. 1, FIG. 2 and FIG. 3, an upper face of the upper cover 11 in the drawing constitutes an embedding stage E for various external relays such as micro relays 20, half-micro relays 21 and 2M relays 22, and for electronic components such as fuses 23. On the embedding stage E, provided are relay outlets 11b, 11c and 11d for various relays such as the micro relays 20, the half-micro relays 21 and the 2M relays 22. In addition, a fuse outlet 11e as fuse fitting positions for the fuses 23 is provided on the embedding stage E.

A plurality of connectors 11f as connector fitting positions for detachably fitting unillustrated opponent connectors are provided intensively on one side (a left portion in FIG. 3) of the upper cover 11.

As shown in FIG. 2, first locking pieces 24 as locking means are provided in a protruding manner on both sidewalls 11a in the X direction of the upper cover 11, and second locking pieces 25 as the locking means are provided in a protruding manner on both sidewalls 13a in the Y direction of the under cover 13. The first and the second locking pieces 24 and 25 severally protrude from the sidewalls 11a and 13a perpendicularly to some extent and then extend parallel to the sidewalls 11a and 13a, thus constituting parallel protruding portions 24a and 25a, respectively. Accordingly, each of the first and the second locking pieces 24 and 25 is formed into an L-shape cross section as a whole.

Each of the parallel protruding portions 24a and 25a of the first and the second locking pieces 24 and 25 is provided with elastic force in a direction perpendicular to the sidewall 11a or 13a. Moreover, inclined planes 24b and. 25b each of which is gradually thickened along a direction toward a tip, are formed on outer planes of the parallel protruding portions 24a and 25a. Furthermore, stepped engaging portions 24c and 25c are formed severally on tips of the inclined planes 24b and 25b.

Figure 12:
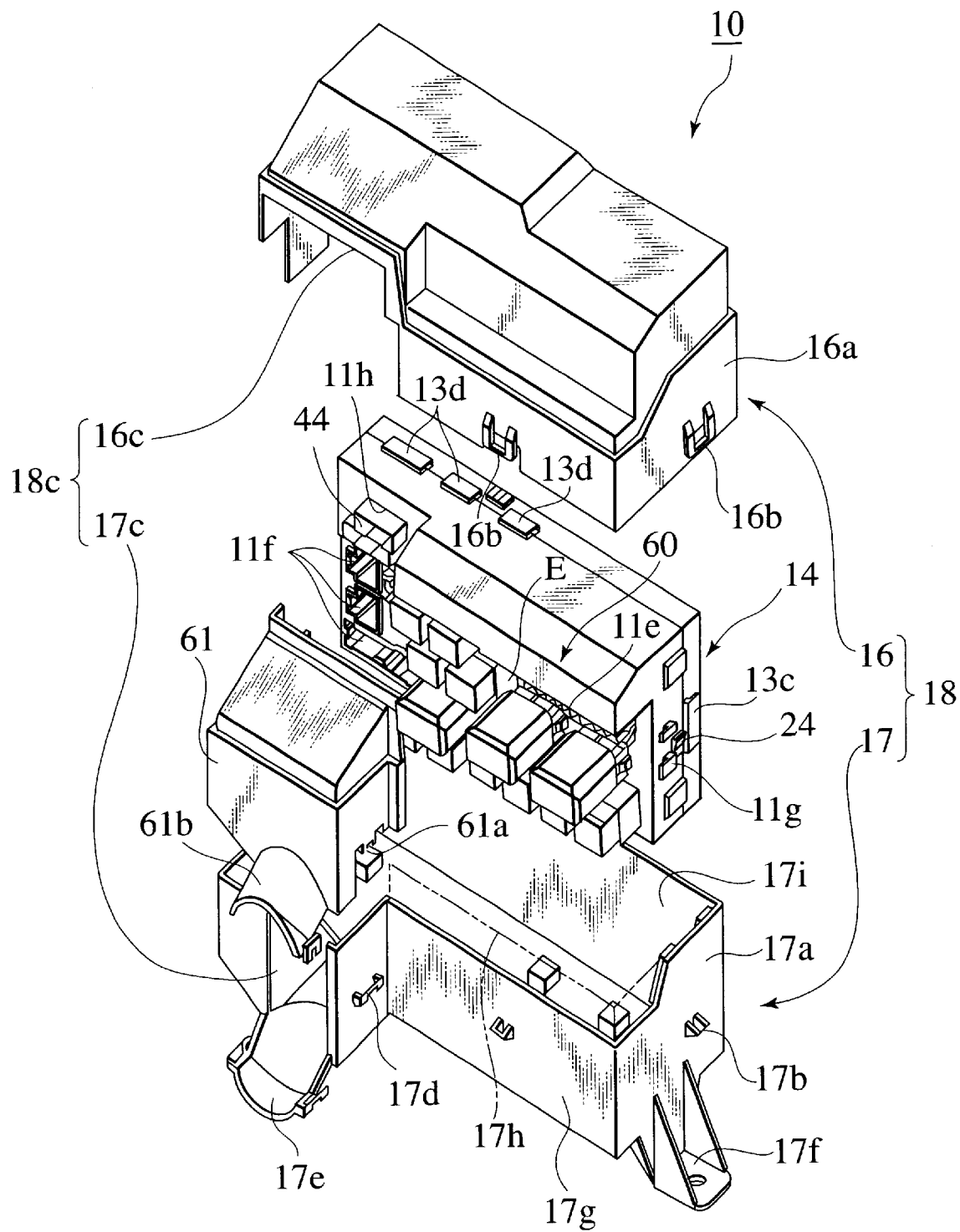
FIG. 12 shows a perspective view describing one embodiment of the junction box according to the present invention in a case of housing the junction box body in the casing in upright disposition.

As shown in FIG. 12, upon housing the junction box body 14 in the lower case 17, the junction box body 14 is designed such that any of the first and the second locking pieces 24 and 25 are engaged with engaging protrusions inside the casing 18 depending on the direction of housing the junction box body 14 (either the Y direction or the X direction).

Concerning engagement of the first or the second locking pieces 24 or 25, when the inclined planes 24b or 25b are pushed into the engaging protrusions in response to dropping the junction box body 14 for housing, the parallel protruding portions 24a or 25a are once flexure-deformed inward. Thereafter, the inclined planes 24b or 25b are released from the engaging protrusions by further dropping the junction box body 14 into the lower case 17. Then, the parallel protruding portions 24a or 25a recover outward, whereby the engaging portions 24c or 25c are engaged with the engaging protrusions.

In this state, the parallel protruding portions 24a or 25a protrude toward a direction reverse to the direction of housing the junction box body 14, i.e. they protrude upward. Therefore, upon unlocking, a jig with a slender tip, such as a screw driver, is inserted from above into a space between the junction box body 14 and the casing 18 in order to catch the tips of the engaging portions 24c or 25c with the tip of the jig, whereby the parallel protruding portions 24a or 25a are bent inward. In this way, engagement of the engaging portions 24c or 25c with the engaging portions can be released easily.

In the vicinity of the portions where the first and the second locking pieces 24 and 25 are formed, first guide hooks 11g and 13c, and second guide hooks 13d are formed so as to protrude severally in a manner of L-shape cross sections. These first and second guide hooks 11g, 13c and 13d serve as guides upon housing the junction box body 14 in the lower case 17, whereby the junction box body 14 can be set to a specified position in the casing 18.

Figure 11:
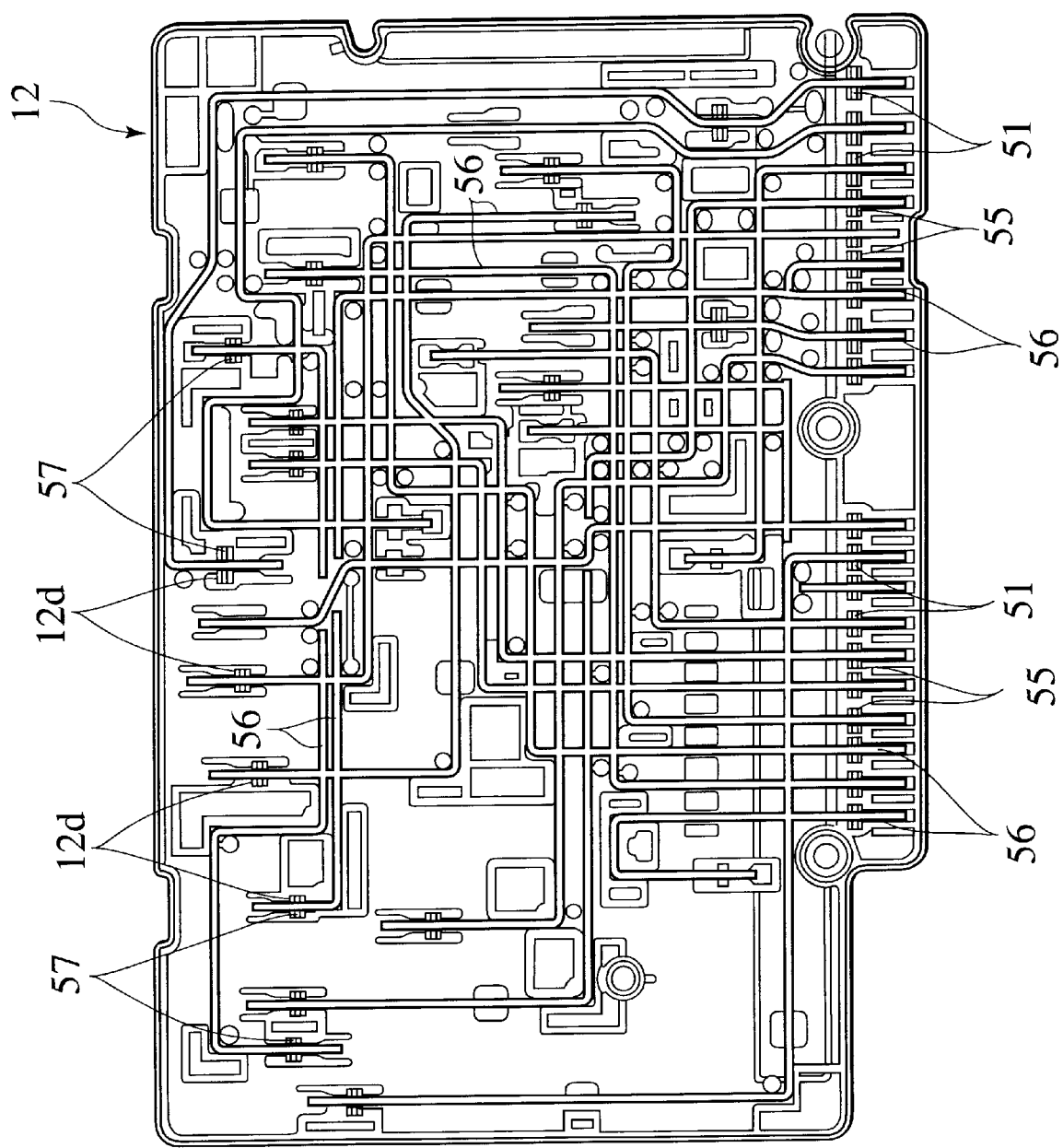
FIG. 11 shows an explanatory view for electric wires cabled on the wiring plate, describing one embodiment of the junction box according to the present invention.

As shown in FIG. 1 and FIG. 11, the wiring plate 12 is a rectangular hard-resin plate similar to an inverted dish, on which numerous wiring holes 12d are formed. Three layers of wiring boards 12a, 12b and 12c are stacked on the wiring plate 12, and a plurality of electric wires 56 are cabled on a rear face of the wiring plate 12 (see FIG. 9).

On the respective wiring boards 12a, 12b and 12c, terminal portions 30, 31 and 32 are erected upward from given positions thereof, whereby bus bars are disposed to constitute desired circuits. Each of the wiring boards 12a, 12b and 12c includes a pressure-welding terminal portion 57 integrally formed on the bus bar to be erected downward from a given position thereof.

Terminals 32 on the low-stage wiring board 12c penetrate the wiring boards 12a and 12b thereabove and protrude out to an upper face of the high-stage wiring board 12a. Meanwhile, the terminals 31 of the middle-stage wiring board 12b also penetrate and protrude from the high-stage wiring board 12a. Thereafter, the wiring boards 12a, 12b and 12c are mutually superimposed. In this event, the pressure-welding portions 57 of the respective wiring boards 12a, 12b and 12c are drawn from the wiring holes 12d to the rear face of the wiring plate 12 and connected to the electric wires 56 by pressure welding (see FIG. 9). Accordingly, desired circuits are formed on the wiring plate 12 with the respective wiring boards 12a, 12b and 12c, and the electric wires 56.

Figure 4:
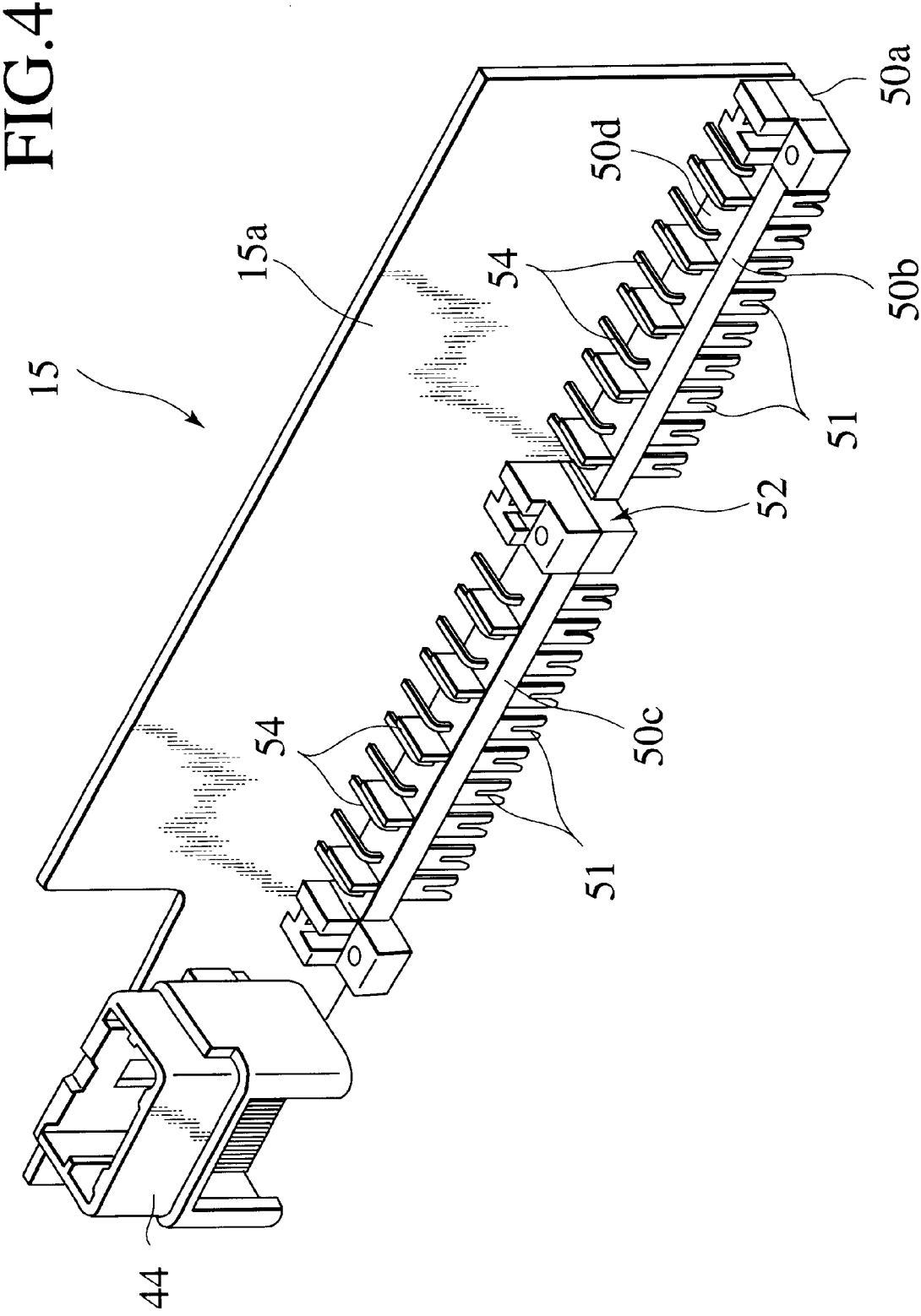
FIG. 4 shows an enlarged perspective view of a basic structure of a control substrate while removing various electronic components, which describes one embodiment of the junction box according to the present invention.

Regarding the control substrate 15, various electronic components such as relays 40, resistors 41, a coil 42 and elements 43 constituting a control circuit are fitted on an insulating plate 15a, and a substrate connector 44 is provided on an end portion in the longitudinal direction of the insulating plate 15a. As shown in FIG.4, the control substrate 15 is disposed in an upright state, and a terminal block 50 is fitted on a bottom end of the front face thereof (the near side in the drawing) almost perpendicularly with respect to a direction of a plane of the control substrate 15. On a perpendicular outer face 50a (the bottom face in the drawing) of the terminal block 50, provided in a protruding manner are a given number of pressure-welding terminals 51 to be connected to the relevant circuits on the respective wiring boards 12a, 12b and 12c via the electric wires 56 on the back of the wiring plate 12.

Figure 5:
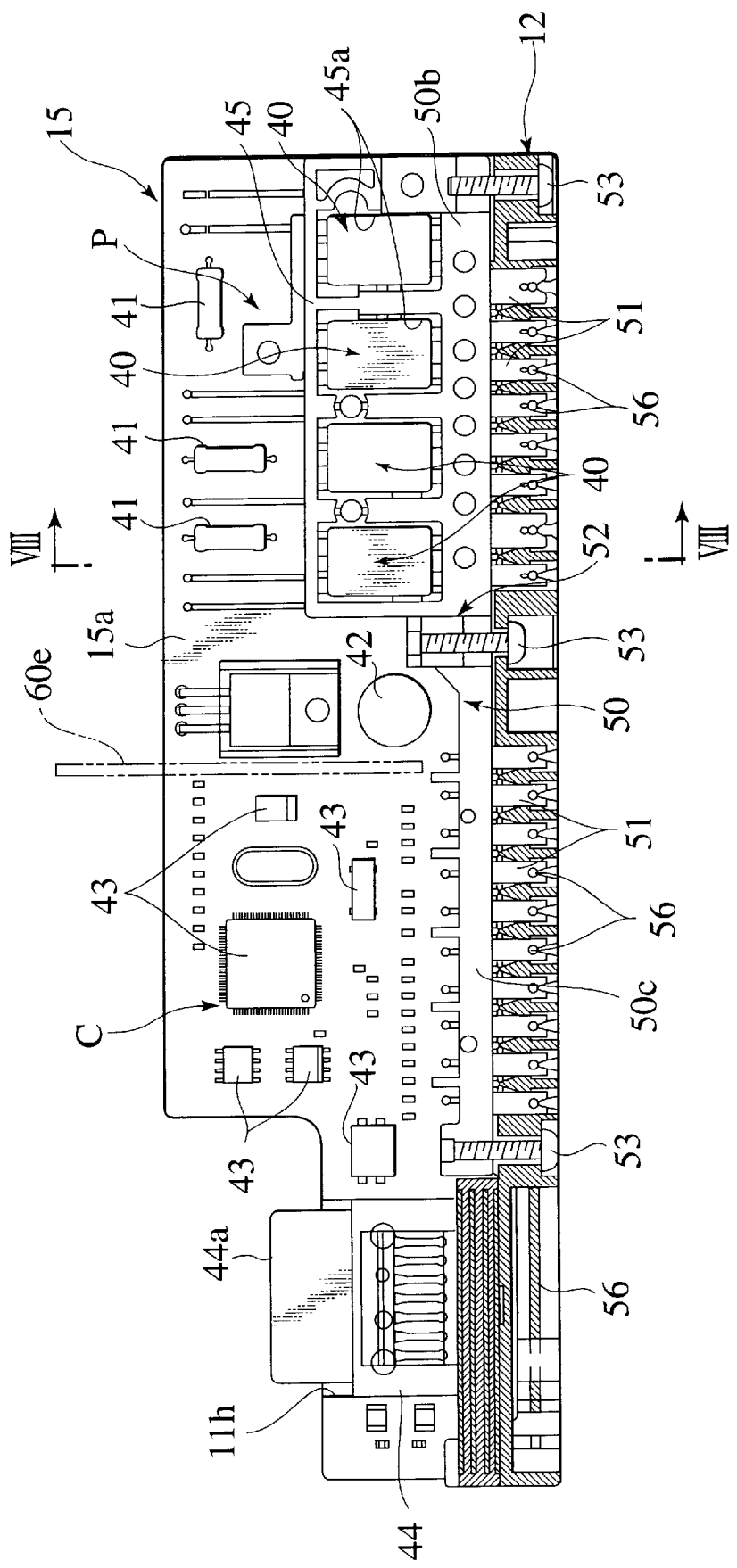
FIG. 5 shows a front view of the control substrate, describing one embodiment of the junction box according to the present invention, in which the control substrate is fitted on a wiring plate, and pressure-welding connection portions of pressure-welding terminals are cut away.

As shown in FIG. 5, among the various electronic components to be fitted to the control substrate 15, the relays 40, the resistors 41 and the coil 42 collectively constitute a power unit P, and the elements 43 constitute a control unit C. The power unit P of large heat generation is combined and disposed on one side in the longitudinal direction (the near side in FIG. 1) of the insulating plate 15a. Meanwhile, the control unit C of small heat generation is combined and disposed on the other side in the longitudinal direction (the far side in FIG. 1) of the insulating plate 15a.

Figure 10:
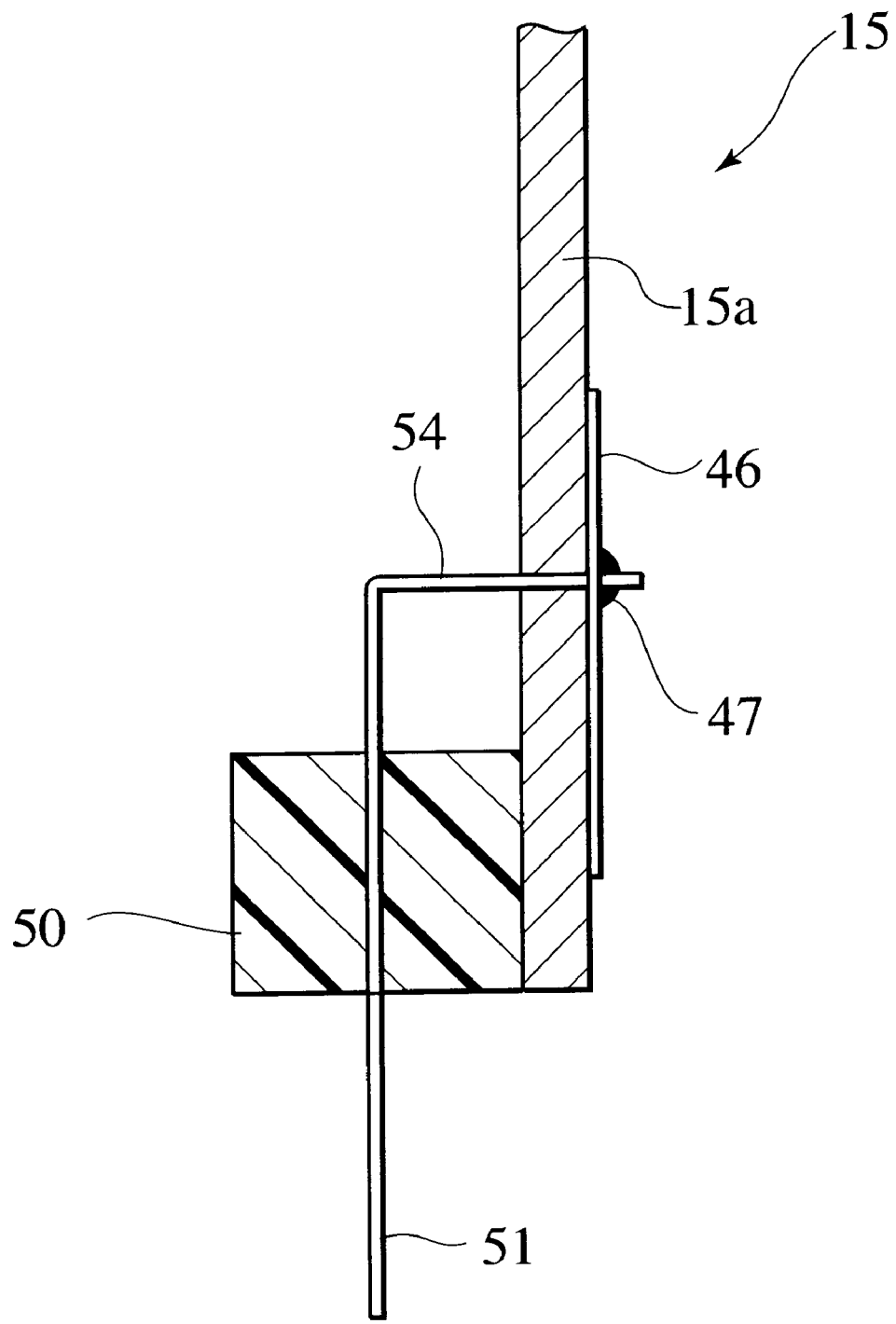
FIG. 10 shows a cross-sectional view of principal parts, describing one embodiment of the junction box according to the present invention, which illustrates a structure of connection between the pressure-welding terminal of the control substrate and a circuit pattern.

The relays 40, the resistors 41 and the coil 42 constituting the power unit P of large heat generation, and the elements 43 constituting the control unit C of small heat generation are connected by a thin circuit pattern 46 (see FIG. 10). As it is generally known, the circuit pattern 46 is formed by printing a conductive material on the insulating plate 15a, and the thickness of the circuit pattern 46 is decided in accordance with the width of printing.

Figure 6:
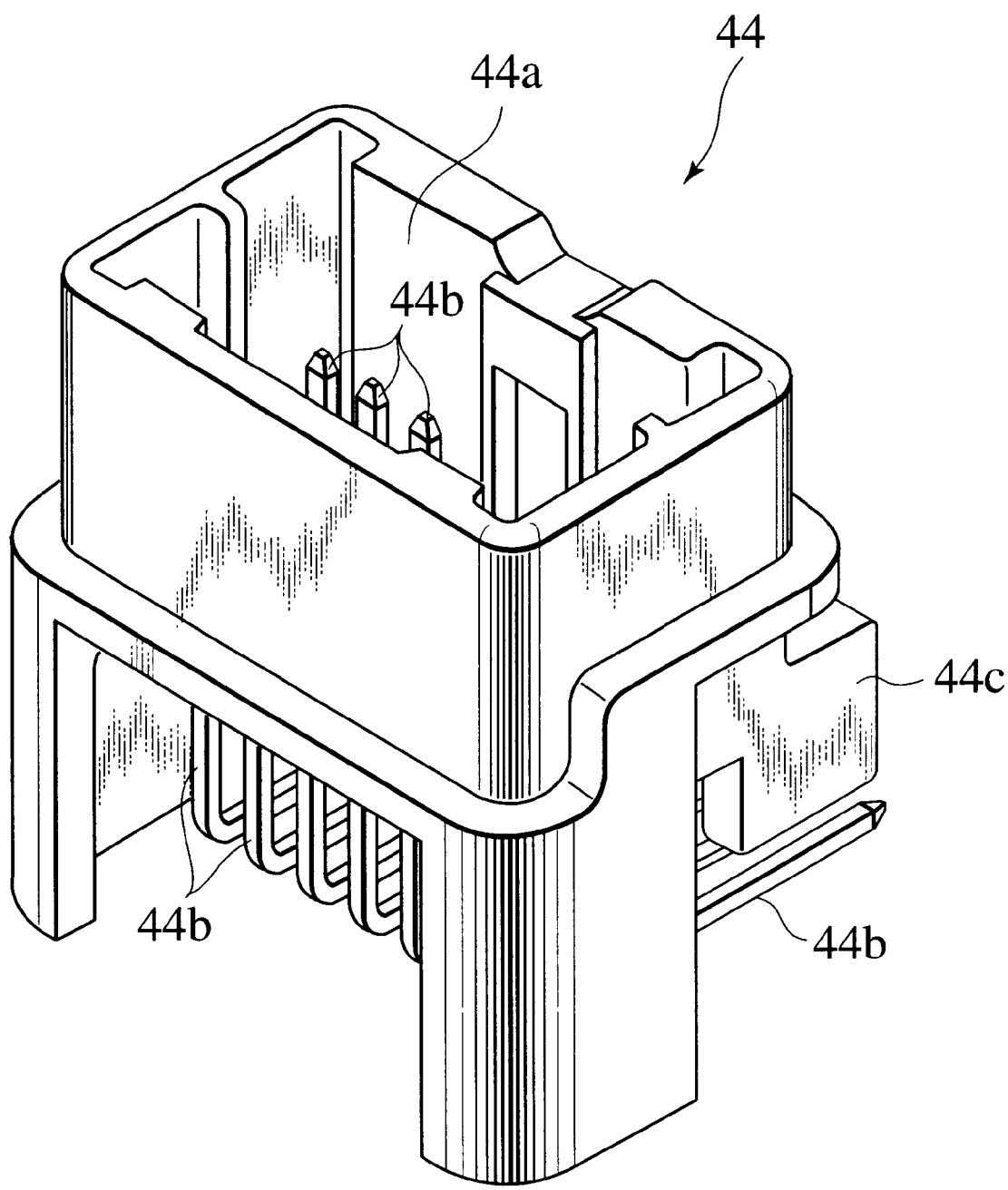
FIG. 6 shows an enlarged perspective view of a substrate connector, describing one embodiment of the junction box according to the present invention.

As shown in FIG. 6, the substrate connector 44 is provided independently of the control substrate 15. Moreover, an unillustrated opponent connector is inserted into a slot 44a formed on the substrate connector 44. End portions of a plurality of terminals 44b to be connected to the opponent connector protrude out within the slot 44a. The other end portions of the terminals 44b protrude outward (downward according to the drawing) from the slot 44a, and respective tips thereof are bent orderly toward a direction perpendicular to the control substrate 15.

Figure 7:
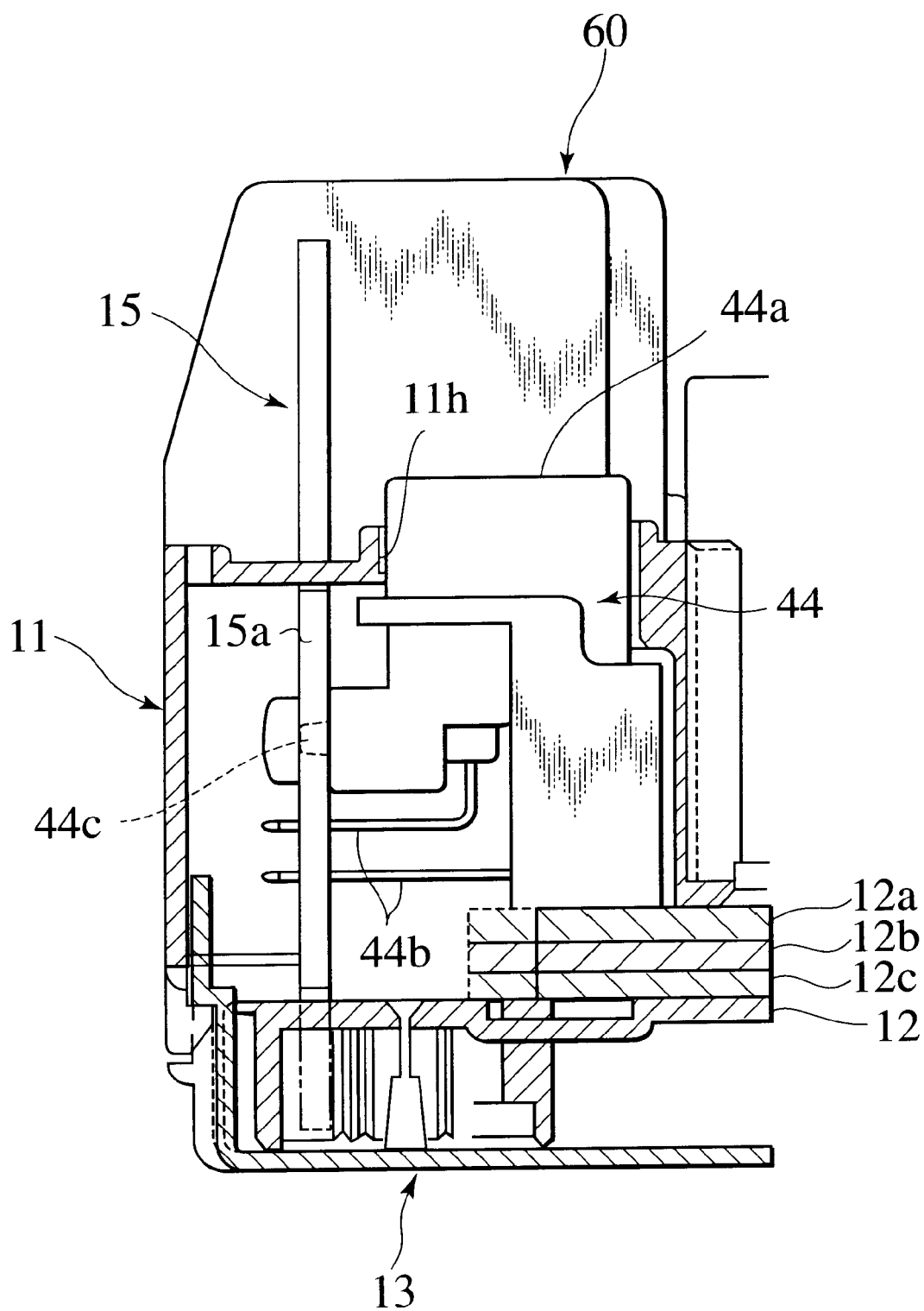
FIG. 7 shows an enlarged cross-sectional view of principal parts, describing one embodiment of the junction box according to the present invention, which is taken along the VII—VII line in FIG. 2.

As shown in FIG. 7, the substrate connector 44 allows a protrusion 44c provided on a back side thereof to be fitted by pressure into an unillustrated fitting hole formed on the insulating plate 15a of the control substrate 15, and inserts the tips of the terminals 44b into the control substrate 15 to connect the tips to the given circuit pattern. In this event, an open portion of the slot 44a of the substrate connector 44 faces outward from an aperture 11h formed on the upper cover 11.

The relay 40 adopts a mechanism using electromagnetic solenoid. Since the relay 40 has a structure for on-and-off switching with this electromagnetic solenoid, heat generation by the electromagnetic solenoid is significant. Accordingly, the relay 40 is fitted to the insulating plate 15a of the control substrate 15 with provision of a given space δ while the relay 40 is supported by a relay holder plate 45 to be described later (see FIG. 8).

Power terminals 40a and 40b of the relay 40 thus fitted with the space 6 are connected to a lead line 40c and to given pressure-welding terminals 51 to be described later, respectively. The lead line 40c once extends long parallel to the insulating plate 15a and protrudes out in a space from the relay 40 until reaching the insulating plate 15a. Meanwhile, a tip of the portion thus exposed by the protrusion is bent toward the insulating plate 15a and soldered (at a soldered portion 47a) to the circuit pattern 46. In this case, the exposed lead line 40c can include a heat releasing function.

Figure 9:
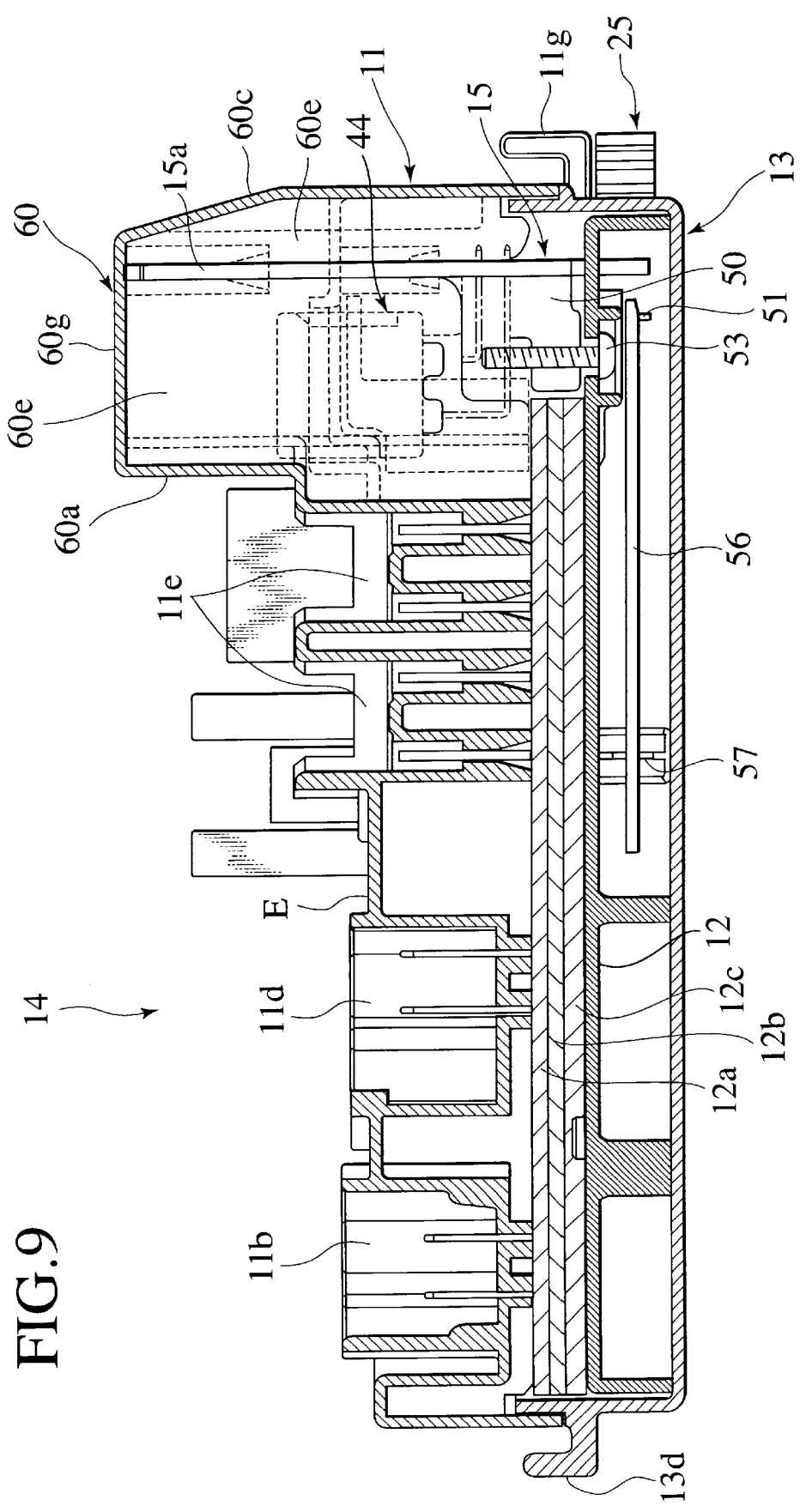
FIG. 9 shows a cross-sectional view describing one embodiment of the junction box according to the present invention, which is taken along the IX—IX line in FIG. 3.

As shown in FIG.4, the terminal block 50 is composed of a first divided block 50b and a second divided block 50c which are bisected approximately in the center portion in the longitudinal direction of the terminal block 50. Mutually abutting end portions of the first and the second divided blocks 50b and 50c are superimposed on each other, thus constituting a superimposed portion 52. As shown in FIG. 9, both end portions of the terminal block 50 and the superimposed portion 52 are fixed by fastening to the wiring plate 12 with screws 53 as fasteners to be inserted from the rear face of the wiring plate 12. In this event, the superimposed portion 52 is fastened integrally with one screw 53 as shown in FIG. 5.

As shown in FIG.5, the relay holder plate 45 is provided on a perpendicular inner face 50d of the first divided block 50b as parallel to the insulating plate 15a of the control substrate 15. Windows 45a are formed on the relay holder plate 45 in accordance with disposing portions of the relays 40. The relays 40 are fitted and held in the windows 45a, whereby the relays 40 fitted to the insulating plate 15a with spaces are stably held.

As shown in FIG. 4, the pressure-welding terminal 51, which is provided in such a manner that one end thereof protrudes from the perpendicular outer face 50a of the terminal block 50, includes a conduction wire portion 54 on the other end thereof, which protrudes upward from the terminal block 50. As shown in FIG. 10, the conduction wire portion 54 is bent perpendicularly toward the insulating plate 15a of the control substrate 15 and then penetrates the insulating plate 15a, and such a penetrating portion is soldered (at a soldered portion 47) to the circuit pattern 46 of the control substrate 15.

Figure 8:
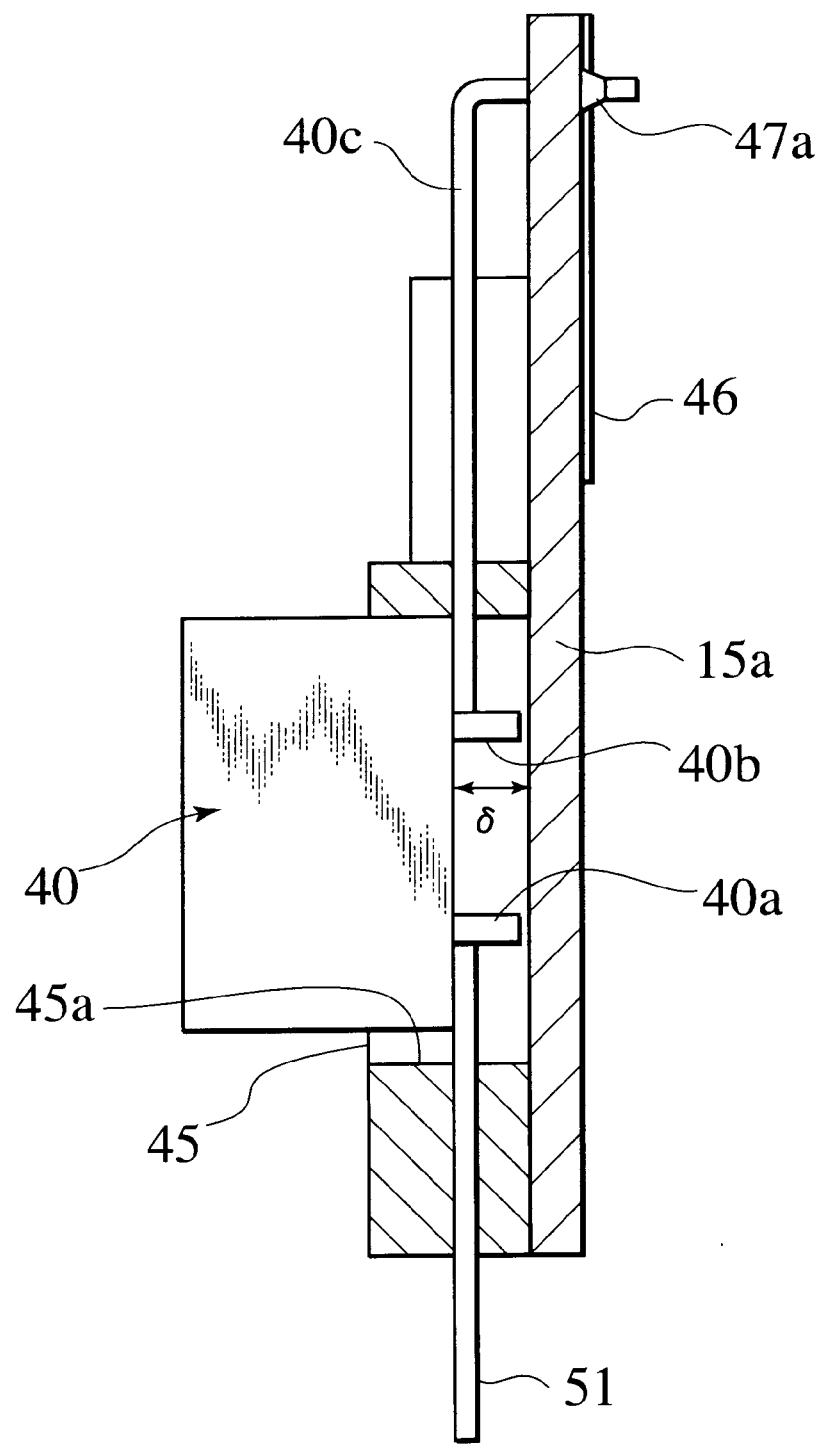
FIG. 8 shows an enlarged cross-sectional view of principal parts, describing one embodiment of the junction box according to the present invention, which is taken along the VIII—VIII line in FIG. 5.

As shown in FIG. 8, the other end of the given pressure-welding terminal 51 to be connected to the above-described relay 40 penetrates the relay holder portion 45 and protrudes into the window 45a.

As shown in FIG. 1, the pressure-welding terminals 51 are inserted into outlets 55 formed on the wiring plate 12. Thereafter, as shown in FIG. 5, the pressure-welding terminals 51 inserted into the outlets 55 are connected to terminals of the electric wires 56 by pressure welding.

The perpendicular outer face 50a of the terminal block 50 abuts on an upper face of the wiring plate 12 and is fixed by fastening in this state with the screws 53. In the state of fixing the terminal block 50 to the wiring plate 12 as described above, the terminal block 50 is placed almost perpendicular to the insulating plate 15a of the control substrate 50. Accordingly, the control substrate 15 is loaded perpendicularly on the wiring plate 12.

As shown in FIG. 1 and FIG. 2, on one side edge (far sides in FIGS. 1 and 2) of the upper cover 11 on the side where the control substrate 15 is fitted on the embedding stage E, formed is an expanded portion 60 having a protruding amount h greater than protrusions by the various external relays 20, 21 and 22, and the fuses 23, which are fitted on the relay outlets 11b, 11c and 11d, and the fuse outlet 11e. Meanwhile, as shown in FIG. 9, the control substrate 15 is contained inside the expanded portion 60.

As shown in FIG. 9, the expanded portion 60 is formed into a U-shaped cross section by a heat shield wall 60a for shielding the control substrate 16 from the relay outlets 11b, 11c and 11c of the upper cover 11, a ceiling wall 60b continuing from the heat shield wall 60a, and a back face wall 60c covering the rear side of the control substrate 15. Moreover, as shown in FIG. 2, both sides of the expanded portion 60 are closed by side walls 60d.

As shown in FIG. 5, the power unit P of large heat generation such as the relays 40, the resistors 41 and the coil 42, and the control unit C of small heat generation such as the elements 43 constituting the control circuit are separately disposed on the control substrate 15. However, as shown in FIG. 9, inside the expanded portion 60, provided is a heat-shielding partition wall 60e to be inserted between the power unit P and the control unit C for shielding between the power unit P and the control unit C. Note that the heat-shielding partition wall 60e is illustrated with a chain double-dashed line in FIG. 5.

Therefore, in the state where the control substrate 15 is contained between the upper cover 11 and the under cover 13, the expanded portion 60 covers the outside of the control substrate 15. Meanwhile, the heat-shielding partition wall 60e is inserted into an interface portion of the control substrate 15 between the portion of large heat generation and the portion of small heat generation.

The above-described casing 18 is composed of the upper case 16 and the lower case 17. A sidewall 16a of the upper case 16 is fitted into an outer periphery of a sidewall 17a of the lower case 17, and a lock claw 16b on the upper case 16 side is detachably engaged with a locking projection 17b of the lower case 17. In this way, the upper case 16 is designed to detachably cover a housing hole 17i of the lower case 17.

As shown in FIG. 12, the junction box body 14, in the case of upright disposition thereof, is contained from the housing hole 17i of the lower case 17 in such a manner that the Y direction of the junction box body 14 (see FIG. 2) is disposed upright (such a state is referred to as upright disposition). Thereafter, the upper case 16 is overlaid from above and engaged with the lower case 17.

Figure 13:
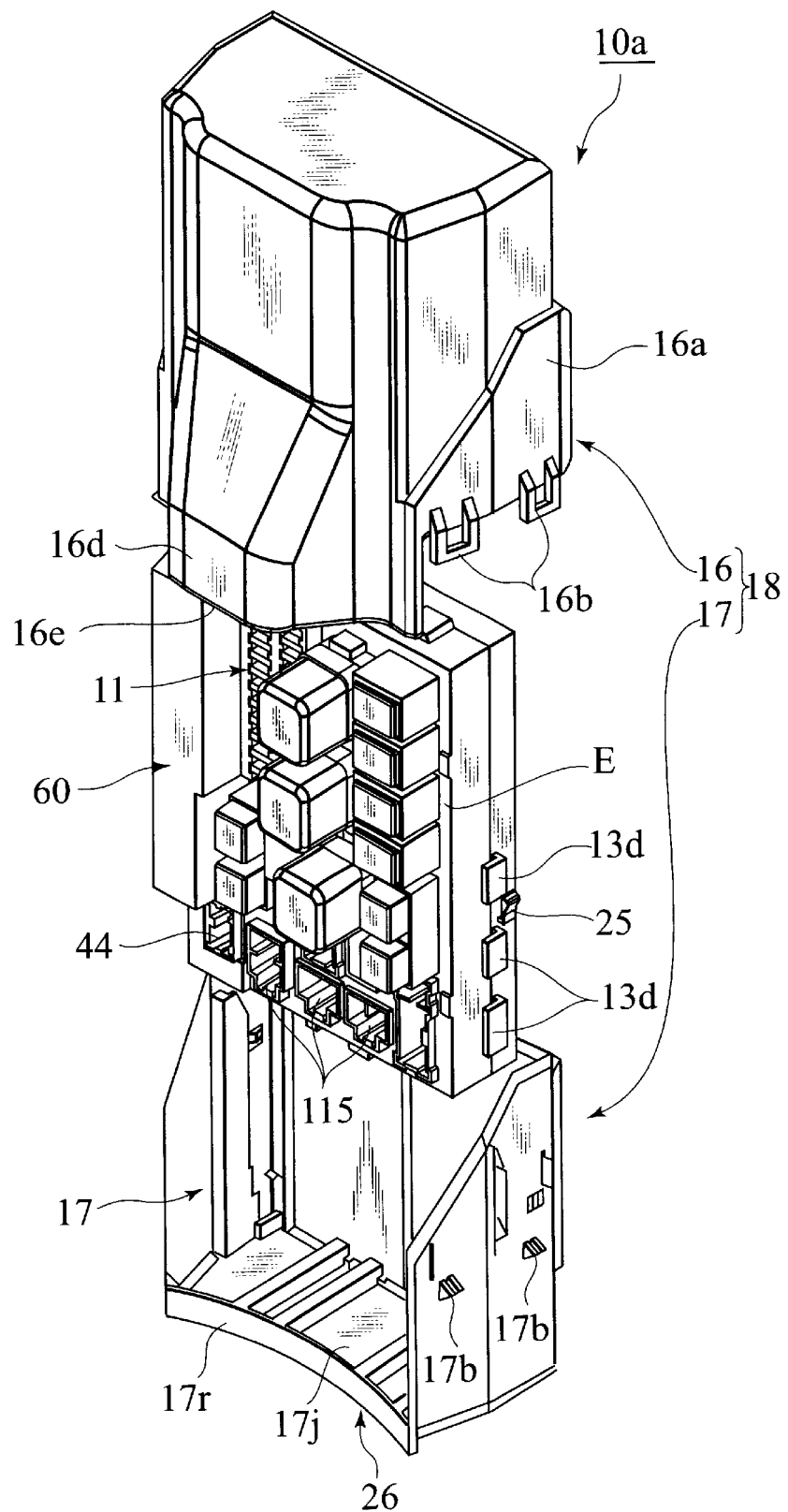
FIG. 13 shows a perspective view describing one embodiment of the junction box according to the present invention in a case of housing the junction box body in the casing in horizontal disposition.

As shown in FIG. 13, in the case of horizontal disposition, the junction box body 14 is contained from the housing hole 17i of the lower case 17 in such a manner that the X direction of the junction box body 14 (see FIG. 2) is disposed upright (such a state is referred to as horizontal disposition). Thereafter, the upper case 16 is overlaid from above and engaged with the lower case 17.

As shown in FIG. 12, regarding the casing 18 for upright disposition of the junction box body 14, the upper case 16 and the lower case 17 severally include openings 16c and 17c formed by cutting away portions corresponding to the connectors 11f intensively provided on the upper cover 11 of the junction box body 14 and to the substrate connector 44. The openings 16c and 17c collectively constitute one opening portion 18a when the upper case 16 and the lower case 17 are mutually fitted together.

Between the openings 16c and 17c, provided is a closing member 61 independently of the upper case 16 and the lower case 17. The closing member 61 closes up a gap between the openings 16c and 17c upon fitting the upper case 16 and the lower case 17. A lock claw 61a of the closing member 61 is detachably fixed to a locking projection 17d of the lower case 17.

In this event, a bottom-half semicylindrical portion 17e formed on the bottom of the opening 17c and a top-half semicylindrical portion 61b formed on the bottom of the closing member 61 coalesce into a tube, whereby the tube permits passage of integrated wire harnesses for unillustrated opponent connectors to be joined to the connectors 11f and the substrate connector 44. Moreover, a fitting leg 17f is provided perpendicularly on the lower case 17.

As shown in FIG. 12, upon housing the junction box body 14 in the casing 11, the junction box body 14 is contained in the lower case 17 in such a manner that the expanded portion 60 is disposed upward. Subsequently, the upper case 16 is fitted into the outer periphery of the lower case 17, and the lock claw 16b and the locking projection 17b are engaged together. Then, the opponent connectors are joined to the connectors 11f and the substrate connector 44 of the junction box body 14 by inserting the opponent connectors from the opening portion 18a. Thereafter, the closing member 61 is disposed on the opening portion 18a and the lock claw 61a is engaged with the locking projection 17d while cabling the wire harnesses between the top-half and bottom-half semi-cylindrical portions 61b and 17e.

Meanwhile, upon housing the junction box body 14 in the casing 18, the embedding stage E of the upper cover 11 is disposed on a front face 17g of the lower case 17, whereby the fuse outlet 11e on the embedding stage E is located at an upper-end right-half portion (as illustrated with a chain double-dashed line in FIG. 12) of the front face 17g of the lower case 17. However, the upper-end right-half portion is cut away in advance to form a cutaway portion 17h where the fuse outlet 11e is exposed. In addition, as shown in FIG. 13, a closing portion 16d is provided on a lower end of a front face of the upper case 16, for covering the cutaway portion 17h.

When the junction box body 14 is contained upright in the lower case 17 by insertion from above and the junction box body 14 is closed with the upper case 16, the first locking pieces 24 on the both sidewalls 11a and 13a in the X direction (see FIG. 2) of the junction box body 14 are engaged with unillustrated locking projections provided on both inner sides collectively constituting a first inner side face of the lower case 17. In addition, the second locking pieces 25 on the both sidewalls 11a and 13a in the Y direction (see FIG. 2) of the junction box body 14 abut elastically on an inner side of a ceiling portion, which constitutes a second inner side face of the upper case 16, via an outer side face of the parallel protruding portion 25b (the thickest part of the inclined plane 24b). In this way, the junction box body 14 is prevented from jolting up-and-down inside the casing 18.

As shown in FIG. 13, regarding a casing 18 for horizontal disposition of the junction box body 14, a front face of a lower case 17 of a junction box 10a facing the embedding stage E is entirely removed to constitute a cutaway portion 17h, whereby the fuse outlet 11e of the junction box 10a is substantially exposed at the cutaway portion 17h when an upper case 16 is detached.

Meanwhile, a front face of the upper case 16 is entirely stretched downward, thus constituting a closing portion 16d for covering the cutaway portion 17h.

A bottom face 17j of the lower case 17 constitutes a forming edge of the cutaway portion. Here, a front end edge 17k of the bottom face 17j is curved so as to depress a central portion thereof Meanwhile, a closing portion 16d of the upper case 16 is formed as a curved face which expands outward, and a tip edge 16e thereof is curved so as to protrude outward.

Therefore, in a state of fitting the upper case 16 and the lower case 17 together, a spindle-shaped aperture is formed between the tip edge 16e of the closing portion 16d and the front end edge 17k of the bottom face 17j. The aperture constitutes a free cabling hole 26 to allow passage of unillustrated wire harnesses to be connected to the external opponent connectors.

When the junction box body 14 is contained horizontally in the lower case 17 by insertion from above and the junction box body 14 is closed with the upper case 16, the second locking pieces 25 on the both sidewalls 11a and 13a in the Y direction (see FIG. 2) of the junction box body 14 are engaged with unillustrated locking projections provided on both inner sides collectively constituting an inner side face of the lower case 17. In addition, the first locking pieces 24 on the both sidewalls 11a and 13a in the X direction (see FIG. 2) of the junction box body 14 abut elastically on an inner side of a ceiling, which constitutes a second inner side face of the upper case 16, via the outer side face of the parallel protruding portion 25b (the thickest part of the inclined plane 24b). In this way, the junction box body 14 is prevented from jolting up-and-down inside the casing 18.

According to the junction box 10 of the embodiment, the control substrate 15 to be a controller is loaded on the wiring plate 12, and the foregoing object is contained between the upper cover 11 and the under cover 13, thus constituting the junction box body 14. The junction box body 14 is contained inside the casing 18 composed of the upper case 16 and the lower case 17, thus constituting the junction box 10. Subsequently, the junction box 10 is fitted inside an engine room of an unillustrated vehicle via the fitting leg 17f of the lower case 17. Unillustrated wire harnesses for various electric components to be installed on the vehicle are connected intensively thereto.

In the embodiment, the first locking pieces 24 are provided on the both sidewalls 11a and 13a in the X direction of the junction box body 14, and simultaneously, the second locking pieces 25 are provided on the both sidewalls 11a and 13a in the Y direction of the junction box body 14. As shown in FIG. 12, when the junction box body 14 is contained upright in the lower case 17, the first locking pieces 24 are engaged with the both inner faces of the lower case 17. In addition, as shown in FIG. 13, when the junction box body 14 is contained horizontally in the lower case 17, the second locking pieces 25 are engaged with the both inner faces of the lower case 17.

In the embodiment, in the case of upright disposition of the junction box body 14, the unengaged second locking pieces 25 abut on the inside of the ceiling of the upper case 16, thus preventing the junction box body 14 from jolting inside the casing 18. Alternatively, in the case of horizontal disposition of the junction box body 14, the unengaged first locking pieces 24 abut on the inside of the ceiling of the upper case 16, thus preventing the junction box body 14 from jolting inside the casing 18 similarly.

Accordingly, it is possible to prevent the junction box body 14 from jolting by efficiently utilizing the unengaged second locking pieces 25 upon upright disposition of the junction box body 14, and the unengaged first locking pieces 24 upon horizontal disposition thereof, respectively. Therefore, it is possible to simplify the structure of the junction box 10 without requirement of a dedicated anti-jolt member to be provided additionally.

The first locking pieces 24 and the second locking pieces 25 possess elastic force at the parallel protruding portions 24b and 25b which abut on the inside of the ceiling of the upper case 16. Therefore, the first and the second locking pieces 24 and 25 can absorb abutment reactive force against the inside of the ceiling with a buffering action, whereby the locking pieces can surely protect the junction box body 14 from vibration and impact when the vehicle is running.

What is claimed is:

1. A junction box for being selectively positioned in one of an upright orientation and a horizontal orientation, the junction box comprising:
   a junction box body;
   a casing for housing the junction box body in one of the upright orientation and the horizontal orientation, the casing comprising a first inner side face and a second inner side face;
   first locking means for engaging the junction box body with the casing, the first locking means being provided on the junction box body; and
   second locking means for engaging the junction box body with the casing, the second locking means being provided on the junction box body,
   wherein the first locking means is engaged with the first inner side face of the casing when the junction box body is disposed in the upright orientation, and the first locking means abuts the second inner side face of the casing when the junction box body is disposed in the horizontal orientation, and
   wherein the second locking means is engaged with the first inner side face when the junction box body is disposed in the horizontal orientation, and the second locking means abuts the second inner side face when the junction box body is disposed in the upright orientation.

2. The junction box of claim 1,
   wherein the first locking means and the second locking means are each configured to elastically absorb reactive forces between the first and second locking means and the second inner side face.

3. A junction box for being selectively positioned in one of an upright orientation and a horizontal orientation, the junction box comprising:
   a junction box body;
   a casing for housing the junction box body in one of the upright orientation and the horizontal orientation, the casing comprising a first inner side face and a second inner side face;
   a first locking piece provided on the junction box body; and
   a second locking piece provided on the junction box body,
   wherein the first locking piece is engaged with the first inner side face of the casing when the junction box body is disposed in the upright orientation, and the first locking piece abuts the second inner side face of the casing when the junction box body is in the horizontal orientation, and
   wherein the second locking piece is engaged with the first inner side face when the junction box body is in the horizontal orientation, and the second locking piece abuts the second inner side face when the junction box body is in the upright orientation.

4. The junction box of claim 3,
   wherein the first locking piece and the second locking piece are each configured to elastically absorb reactive forces between the first and second locking pieces and the second inner side face.

5. The junction box of claim 3,
   wherein the first locking piece and the second locking piece comprise L-shaped cross sections.

6. The junction box of claim 5, further comprising:
   a first parallel protruding portion provided on the first locking piece; and
   a second parallel protruding portion provided on the second locking piece,
   wherein the first parallel protruding portion is configured to protrude in a direction opposite to a direction in which the junction box is inserted into the casing when the junction box body is in the upright orientation, and
   wherein the second parallel protruding portion is configured to protrude a direction opposite to a direction in which the junction box is inserted into the casing when the junction box body is in the horizontal orientation.

* * * * *

UNITED STATES PATENT AND TRADEMARK OFFICE
CERTIFICATE OF CORRECTION

PATENT NO.    : 6,515,226 B2
DATED         : February 4, 2003
INVENTOR(S)   : Akihiko Chiriku, Norio Ito and Hiroyuki Sasaki It is certified that error appears in the above-identified patent and that said Letters Patent is hereby corrected as shown below:

<u>Title page,</u>
Item [74], *Attorney, Agent or Firm*, "Farrabow" should read -- Farabow --.

Signed and Sealed this

Thirteenth Day of May, 2003

JAMES E. ROGAN
*Director of the United States Patent and Trademark Office*